United States Patent [19]

Inoue et al.

[11] 4,391,320

[45] Jul. 5, 1983

[54] METHOD AND AN APPARATUS FOR AIR CONDITIONING FOR VEHICLES BY CONTROLLING CIRCULATION OF INSIDE AIR AND INTRODUCTION OF OUTSIDE AIR

[75] Inventors: Yozo Inoue, Chiryu; Yoji Ito; Kiyoshi Hara, both of Kariya; Kiyoshi Usami, Oobu; Yasuhiro Iwata, Aichi, all of Japan

[73] Assignee: Nippondenso Co., Ltd., Kariya, Japan

[21] Appl. No.: 171,030

[22] Filed: Jul. 22, 1980

[30] Foreign Application Priority Data

Jul. 24, 1979 [JP] Japan .................................. 54-94769

[51] Int. Cl.³ ............................................. F25B 29/00
[52] U.S. Cl. ......................................... 165/2; 165/12; 165/28; 165/43; 165/16; 62/157; 62/180; 62/244; 62/409; 236/49
[58] Field of Search ....................... 165/12, 16, 28, 42, 165/43, 2; 62/180, 203, 243, 244, 409, 410, 411, 412, 157; 236/49

[56] References Cited

U.S. PATENT DOCUMENTS

| 3,315,730 | 4/1967 | Weaver et al. | 165/23 |
| 4,186,564 | 2/1980 | Myers | 165/16 X |
| 4,210,278 | 7/1980 | Obler | 165/16 X |
| 4,250,716 | 2/1981 | Huffman | 62/180 |
| 4,289,195 | 9/1981 | Bellot et al. | 165/12 |
| 4,289,272 | 9/1981 | Murase et al. | 165/28 X |
| 4,293,027 | 10/1981 | Tepe et al. | 165/12 |

Primary Examiner—Samuel Scott
Assistant Examiner—Margaret A. Focarino
Attorney, Agent, or Firm—Cushman, Darby & Cushman

[57] ABSTRACT

A method for air conditioning for vehicles comprising a step of detecting a temperature of a passenger compartment of a vehicle, an atmospheric temperature and a preset temperature in the initial period of air conditioning, a step of judging the results of comparisons between said temperatures and a step of switching between air conditioning by the circulation of inside air and air conditioning by the introduction of outside air.

3 Claims, 4 Drawing Figures

Fig. 1

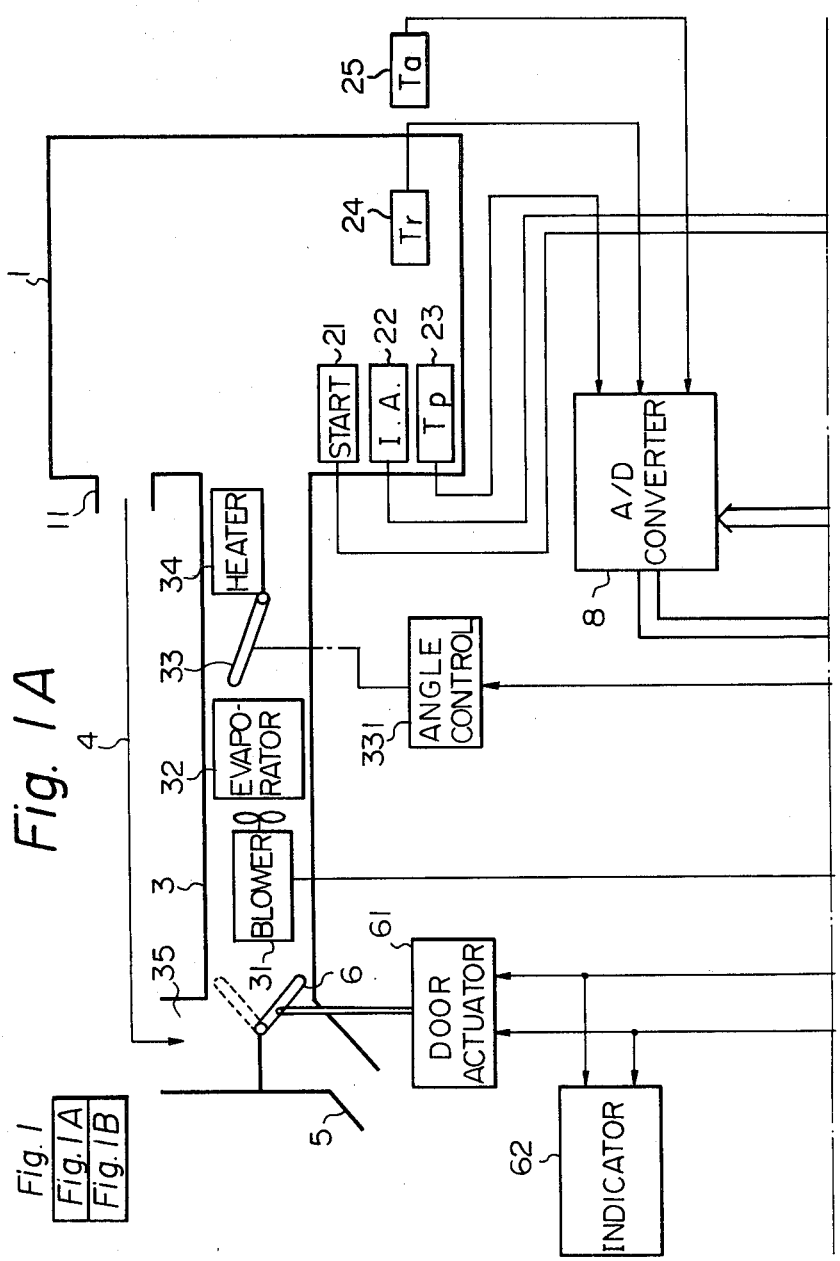

METHOD AND AN APPARATUS FOR AIR CONDITIONING FOR VEHICLES BY CONTROLLING CIRCULATION OF INSIDE AIR AND INTRODUCTION OF OUTSIDE AIR

TECHNICAL FIELD

The present invention relates to a method and apparatus for air conditioning for vehicles with passenger compartments, such as automobiles, by controlling the circulation of inside air and the introduction of outside air.

BACKGROUND ART

A method for controlling an automobile air conditioner has been known in which heating or cooling of air is controlled by an air conditioner and a switch door in the path of the air is switched between a position enabling the circulation of inside air and a position enabling the introduction of outside air (See U.S. Pat. No. 3,315,730). However, in such a prior art method, only a limited number of variables are detected to determine the switching between the circulation of inside air and the introduction of outside air. Accordingly, such a prior art method cannot comply with the requirement that the air conditioning for a vehicle should be controlled by taking into account various factors associated with the conditions of the vehicle and the temperature at any time of year.

SUMMARY OF THE INVENTION

It is the main object of the present invention to provide a method and an apparatus of air conditioning for vehicles by controlling the circulation of inside air and the introduction of outside air in which the air conditioning for a vehicle is effected in optimal manner in accordance with the relationships among a passenger compartment temperature, an atmospheric temperature and a preset temperature.

According to the present invention, a method for air conditioning for vehicles with passenger compartments by controlling the circulation of inside air and the introduction of outside air is provided in which an inlet for inside air and an inlet for outside air are selectively opened and closed, and the circulation of inside air and the introduction of outside air are selectively effected, said method is characterized in comprising a step of detecting a temperature of a passenger compartment of a vehicle, atmospheric temperature and a preset temperature in an initial period of air conditioning, a step of judging the results of comparisons between said temperatures and a step of switching between air conditioning by the circulation of inside air and air conditioning by the introduction of outside air.

BRIEF DESCRIPTION OF THE DRAWINGS

FIGS. 1A and 1B illustrate an apparatus for air conditioning for an automobile in accordance with an embodiment of the present invention.

DESCRIPTION OF THE PREFERRED EMBODIMENTS

Figure 1B:
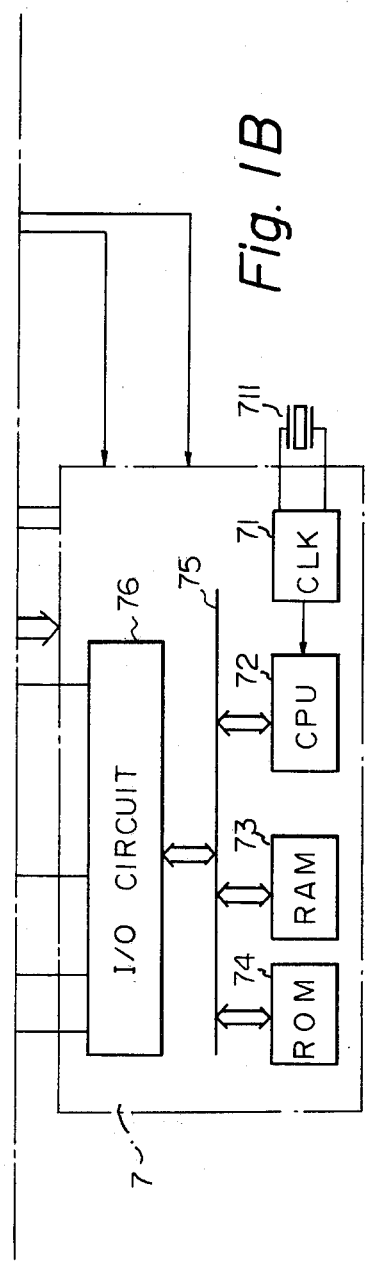

A system of air conditioning for an automobile in accordance with an embodiment of the present invention is illustrated in FIGS. 1A and 1B. A duct 3 is connected to a passenger compartment 1, a switch door 6, a blower 31, an evaporator 32, an air blend door 33 and a heater 34 are provided in the duct 3. When the switch door 6 is in its uppermost position, outdoor air is introduced into the passenger compartment 1 through an inlet 5 and the duct 3 and is exhausted through an outlet 11. When the switch door 6 is in its lowermost position, the inside air is circulated from the passenger compartment 1 through an inside air channel 4 and the duct 3 and back to the passenger compartment 1. The blending of the air cooled by the evaporator 32 and the air heated by the heater 34 is controlled by the angle of the air blend door 33.

A starter switch 21, an inside air circulation command switch 22, a manual temperature preset device 23 and a passenger compartment temperature sensor 24 are arranged in the passenger compartment 1. An outside air temperature sensor 25 is provided outside the passenger compartment 1. The position of the switch door 6 is controlled by a door actuator 61. The angle of the air blend door 33 is controlled by an angle controller 331.

A computer circuit 7 and an analog-to-digital converter 8 are provided to control the air conditioning system of FIGS. 1A and 1B. The computer circuit 7 comprises a clock circuit 71, a central processing unit 72, a random access memory 73, a read only memory 74, a bus 75 and an I/O circuit 76. The computer circuit 7 is powered by a voltage (e.g. 5 volt) stabilized power source (not shown in FIG. 1B) which is powered by a storage battery provided in the vehicle. The read only memory 74 stores control programs defining calculation procedures in steps of control. The central processing unit 72 effects the calculation using the control programs which are read out step by step from the read only memory 74. The output signals of the I/O circuit 76 are supplied to the door actuator 61, an indicator 62, the blower 31 and the angle controller 331. The clock circuit 71 receives the output of a crystal oscillator 711. The analog-to-digital converter 8 is connected with the computer circuit 7. The outputs of the starter switch 21 and the inside air circulation command switch 22 are supplied to the computer circuit 7. The outputs of the manual temperature preset device 23, the passenger compartment temperature sensor 24 and the outside air temperature sensor 25 are supplied to the analog-to-digital converter 8.

Due to the computation effected in the computer circuit 7, the status of an initial period of air conditioning is detected and three temperatures i.e. an outside air temperature, an inside air temperature and a preset temperature are compared. As a result of the computation in the computer circuit 7, these control signals produced by the I/O circuit 76 of the computer circuit 7 are supplied to the door actuator 61, the blower 31 and the angle controller 331 to effect the selection between the circulation of inside air and the introduction of outside air.

Figure 2:
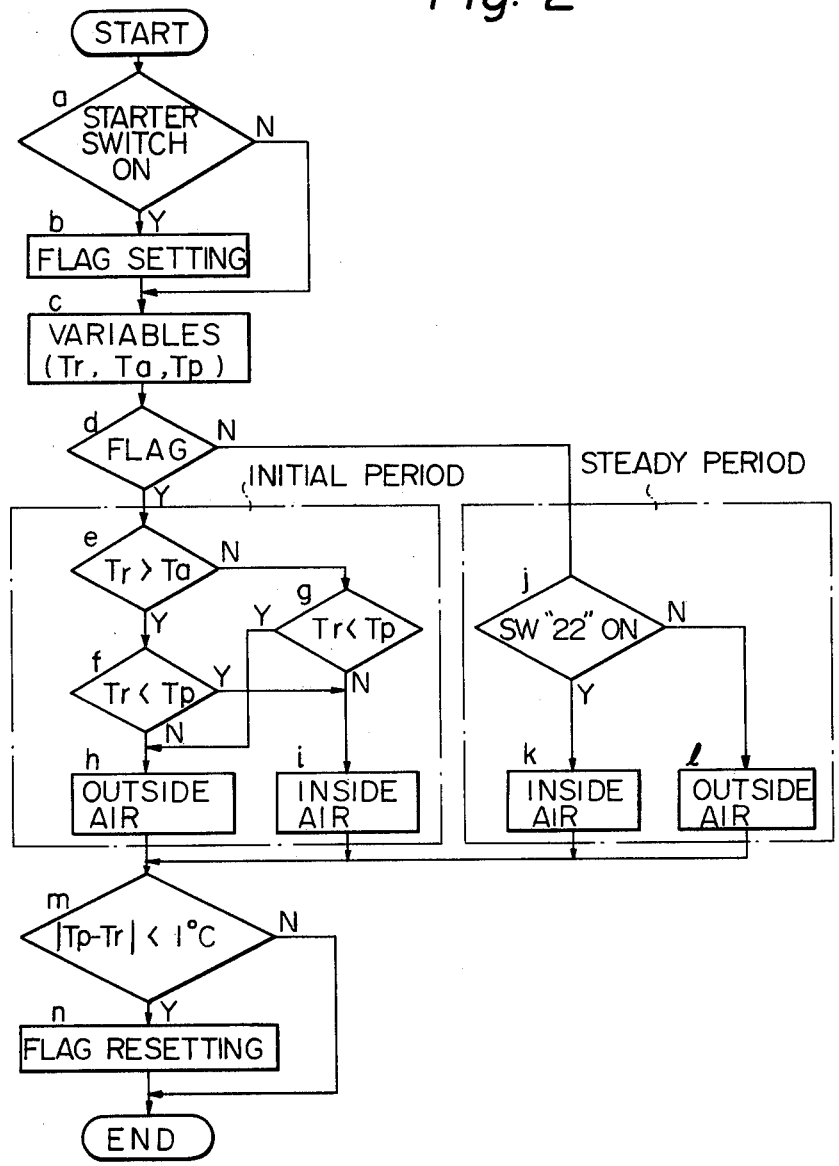
FIG. 2 illustrates a logic flow chart of a control procedure for the system of FIGS. 1A and 1B, and, FIG. 3 illustrates a modified embodiment of a switch door.

The control procedure for controlling the door actuator 61 will now be described with reference to a logic flow chart FIG. 2.

The computer circuit 7 starts operation by receiving a power supply with a stabilized voltage from the voltage stabilized power source. The computer circuit 7 effects the calculation of the control programs on the order of a millisecond with the cycle on the order of a hundred milliseconds. At the beginning of the procedure, the on/off condition of the starter switch 21 is determined at a step a. If the starter switch 21 is in an ON state, a flag which indicates the status of the initial period of air conditioning is set at a step b, while if the starter switch 21 is in an OFF state, the procedure proceeds directly to a step c without passing through step b. At the step c, the variables, i.e. Tr (passenger compartment temperature), Ta (atmospheric temperature) and Tp (preset temperature), which are detected by the passenger compartment temperature sensor 24, the outside air temperature sensor 25 and the manual temperature preset device 23, are supplied to the computer circuit 7 via the analog-to-digital converter 8. Then the procedure proceeds to a step d where the existence of a flag is determined. If a flag exists, the procedure proceeds to a step e which is the first step of the initial period control steps, while if no flag exists, the procedure proceeds to a step j which is the first step of the steady period control steps.

Comparisons between Tr and Ta, and, Tr and Tp, are effected in steps e, f and g. Either the step h, which instructs the introduction of outside air, or a step i, which instructs the circulation of inside air, is selected according to the results of the judgements in the steps e, f and g.

Whether or not the inside air circulation command switch 22 is in an ON state is determined at the step j to select either a step k which instructs the circulation of inside air or a step l which instructs the introduction of outside air.

After steps h, i, k and l, the procedure proceeds to a step m where it is determined whether or not the absolute value of the difference between Tp and Tr is less than one degree centigrade. If this absolute value is less than one degree centigrade, the flag is reset at a step n and the procedure is terminated. However, if this absolute value is not less than one degree centigrade, the procedure is terminated without passing through the step n.

Examples of the manner of control of the system of FIGS. 1A and 1B will now be explained with reference to FIG. 2. Firstly, a control manner for the condition:

$$Ta > Tr > Tp \text{ or } Ta < Tr < Tp$$

is explained. This condition is realized when the passenger compartment temperature is between the atmospheric temperature and the preset temperature. In the initial period of air conditioning, the procedure proceeds from the step a through the steps b, c and d to the step e. Under the above mentioned temperature condition, the procedure proceeds either from the input of the step e through the input of the step f to a Y (yes) output of the step f or from the input of the step e through the input of the step g to an N (no) output of the step g. Thus, the inside air circulation instruction (step i) is produced in the I/O circuit 76 of the computer circuit 7 so that the door actuator 61 is controlled to make the position of the switch door 6 be in its lowermost position. Accordingly, the air conditioning by inside air circulation is carried out. Even if the procedure proceeds to the step m, the result of judgement at the step m is N (no) because in the initial period of air conditioning the difference between Tr and Tp is usually greater than one degree centigrade.

The above described procedure from the step a via the steps b, c, d, e, f, g and i to the N (no) output of the step m is repeated until the judgement at the step m becomes Y (yes) regardless of whether the step a is at N (no).

When the judgement at the step m becomes Y (yes) as a result of air conditioning of the passenger compartment 1, the step n produces an instruction to reset the flag. Then, the judgement at the step d becomes N (no) and the procedure proceeds to the step j. If the inside air circulation command switch 22 is in an OFF state, the judgement at the step j produces a N (no) output and the instruction of introduction of outside air is produced at the step l so that the I/O circuit 76 of the computer circuit 7 controls the door actuator 61 to make the position of the switch door 6 be in its uppermost position. Accordingly, the manner of air conditioning is changed from inside air circulation to an introduction of outside air. Then, the above described procedure from the step a via the steps d, j and l to the step n is repeated.

During this repetition, if the inside air circulation command switch 22 is switched on, the judgement at the step j becomes Y (yes) so that the instruction of inside air circulation is produced at the step k so that the I/O circuit 76 of the computer circuit 7 controls the door actuator 61 to make the position of the switch door 6 be in its lowermost position. Accordingly, the manner of air conditioning is changed from an introduction of outside air to inside air circulation.

Secondly, a control manner for the condition:

$$Tr > Ta > Tp$$

is explained. This condition is realized when the air conditioning is applied to an automobile which is not in motion and has its doors and windows closed when the atmospheric temperature is high. In this case, the passenger compartment temperature has been raised extraordinarily higher than Ta and Tp. In the initial period of air conditioning, the procedure proceeds from the steps a through b, c and d to the step e. Under the above mentioned temperature condition, the step e produces the Y (yes) output which is supplied to the step f, and then the step f produces the N (no) output which is supplied to the step h. Thus the introduction of outside air instruction is produced in the I/O circuit 76 of the computer circuit 7, so that the air conditioning by introduction of outside air is carried out in order to discharge quickly the heat accumulated in the passenger compartment 1. Although the procedure proceeds to the step m, the result of judgement at the step m is N (no) because the difference between Tr and Tp is greater than one degree centigrade.

The above described procedure from the step a via the steps b, c, d, e, f and h to the N (no) output of the step m is repeated until the room temperature Tr falls down to the atmospheric temperature Ta. When the room temperature Tr falls below the atmospheric temperature Ta, the step e produces N (no) output which is supplied to the step g. Then, the step g produces N (no) output which is supplied to the step i. Accordingly, the circulation of inside air instruction is produced in the I/O circuit 76 of the computer circuit 7 so that the air conditioning by the circulation of inside air is carried out.

After further air conditioning is carried out, when the difference between Tr and Tp is reduced to less than one degree centigrade, the judgement at the step m becomes Y (yes) and the step n produces an instruction to reset the flag. Then, the judgement at the step d is turned to N (no) and the procedure proceeds to the step j. If the inside air circulation command switch is in an OFF state, the judgement at the step j produces a N (no) output and the instruction of introduction of outside air is produced at the step l so that the air conditioning by introduction of outside air is carried out.

Figure 3:
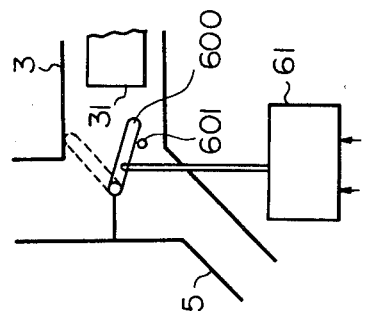

A modified embodiment of a switch door is illustrated in FIG. 3. The lowermost position of the switch door 600 is limited by a stopper 601. When the door 600 is in such a lowermost position limited by the stopper 601, air conditioning is carried out by both circulation of inside air and introduction of outside air. However, when the door 600 is in the uppermost position, air conditioning is carried out by the introduction of outside air. The instruction of circulation of inside air produced by the I/O circuit 76 (FIG. 1B) causes the position of the door 600 to be in the lowermost position limited by the stopper 601, while the instruction of introduction of outside air produced by the I/O circuit 76 causes the position of the door 600 to be in the uppermost position.

With regard to the apparatus of FIGS. 1A and 1B, it is possible to use a microcomputer as the computer circuit 7. A microcomputer of 8048 type, manufactured by INTEL CORP. may be used. It is also possible to locate one fan at the inlet 5 for introducing outside air and locate the other fan at a portion 35 of the duct 3 for circulating inside air, in place of the switch door 6. In such a case, switching between the outside air introduction and the inside air circulation can be carried out by switching selectively between these two fans.

It is possible to combine the control of the flow rate of the blower 31 to the control of the introduction of outside air and the circulation of inside air in the initial period of air conditioning as described hereinbefore with reference to FIGS. 1A, 1B, 2 and 3. Such a control of flow rate of the blower 31 can be effected in such a manner that the introduction of outside air is conducted at the maximum flow rate and the flow rate for the circulation of inside air is controlled so that the flow rate is reduced gradually from the maximum flow rate.

It is possible to determine the ratio $Tr<Tp$ prior to determining that of $Tr>Ta$, instead of determining the ratio $Tr>Ta$ prior to determining that of $Tr<Tp$ as described hereinbefore.

It is possible to change the position of the switch door 6 by manual operation by a person in the passenger compartment in accordance with indications of the indicator 62 which indicates the door control signal produced by the I/O circuit 76, instead of by the automatic control by the door actuator 61 described hereinbefore.

It is possible to add controls by the detection of harmful gases, by the detection of the capacity of air conditioning, by the detection of humidity and the like to the control by the inside air circulation command switch 22 described hereinbefore.

It is possible to present a value in the computer circuit 7 which corresponds to the preset temperature, for example, 25° C., instead of conducting the temperature preset by the manual temperature preset device 23 as described hereinbefore. Also, it is possible to provide means for modifying the above mentioned preset value in the computer circuit 7 in accordance with a change in atmospheric temperature.

We claim:

1. A method for air conditioning for vehicles with passenger compartments by controlling circulation of inside air and introduction of outside air in which an inlet for inside air and an inlet for outside air are selectively opened and closed, and the circulation of inside air and the introduction of outside air are selectively effected, characterized in that said method comprises: a step of detecting a temperature of a vehicle passenger compartment, atmospheric temperature and a preset temperature in an initial period of air conditioning, a step of judging the results of comparisons between said temperatures, a step of switching between air conditioning by the circulation of inside air and air conditioning by the introduction of outside air, a step of producing an instruction for the introduction of outside air if either the passenger compartment temperature is higher than the atmospheric temperature and higher than a preset temperature or if the passenger compartment temperature is lower than the atmospheric temperature and lower than a preset temperature, and a step of producing an instruction for the circulation of inside air if one of the following conditions is established:
   (a) the passenger compartment temperature is higher than the atmospheric temperature and lower than a preset temperature,
   (b) the passenger compartment temperature is lower than the atmospheric temperature and higher than a preset temperature.

2. Air conditioning apparatus for vehicles with passenger compartments comprising an inlet for inside air and an inlet for outside, means for selectively opening and closing said inlets to selectively effect air conditioning by circulation of inside air and introduction of outside air to the passenger compartment, means for detecting a temperature of the passenger compartment, means for detecting atmospheric temperature and means for setting a preset temperature in an initial period of air conditioning and means for performing comparisons among said temperatures, means for effecting air conditioning in accordance with said comparisons by introduction of outside air if either the passenger compartment temperature is higher than the atmospheric temperature and higher than a preset temperature or if the passenger compartment temperature is lower than the atmospheric temperature and lower than a preset temperature, means for effecting air conditioning in accordance with said comparisons by circulation of inside air if one of the following conditions is established:
   (a) the passenger compartment temperature is higher than the atmospheric temperature and lower than a preset temperature,
   (b) the passenger compartment temperature is lower than the atmospheric temperature and higher than a preset temperature.

3. An apparatus for air conditioning for vehicles by controlling circulation of inside air and introduction of outside air in which an inlet for inside air and an inlet for outside air are selectively opened and closed and the circulation of inside air and the introduction of outside air are selectively effected, characterized in that said apparatus comprises:
   means for sensing the temperature of a passenger compartment of a vehicle;
   means for sensing atmospheric temperature;
   means for presetting a preset temperature;
   switch means for causing a start of the air conditioning;
   a starter switch of the vehicle;

an inside air switch for instructing inside air circulation; and computer means for producing a control signal for selectively opening and closing said inlet for inside air or said inlet for outside air in accordance with data supplied by said temperature sensing and presetting means in an initial period of air conditioning, said computer means carrying out a calculation including a step for producing an instruction for outside air introduction if either the passenger compartment temperature is higher than the atmospheric temperature and higher than a preset temperature or if the passenger compartment temperature is lower than the atmospheric temperature and lower than a preset temperature, when said starter switch is in the ON state and either if the passenger compartment temperature is higher than the atmospheric temperature and lower than a preset temperature or if the passenger compartment temperature is lower than the atmospheric temperature and higher than a preset temperature, while producing an instruction for inside air circulation if said inside air switch is in the ON state and producing an instruction for outside air introduction if said inside air switch is in the OFF state and either if the passenger compartment temperature is higher than the atmospheric temperature and higher than a preset temperature or if the passenger compartment temperature is lower than the atmospheric temperature and lower than a preset temperature, when said starter switch is in the OFF state.

* * * * *

UNITED STATES PATENT AND TRADEMARK OFFICE
CERTIFICATE OF CORRECTION

PATENT NO. : 4,391,320

DATED : July 5, 1983

INVENTOR(S) : Yozo INOUE; Yoji ITO; Kiyoshi HARA; Kiyoshi USAMI & Yasuhiro IWATA It is certified that error appears in the above-identified patent and that said Letters Patent is hereby corrected as shown below:

On the Title Page:

Please add to Item [73] the following omitted Assignee:

--TOYOTA JIDOSHA KOGYO KABUSHIKI KAISHA, Toyota-shi, Japan--

Signed and Sealed this

Fifth Day of June 1984

[SEAL]

*Attest:*

GERALD J. MOSSINGHOFF

*Attesting Officer*  *Commissioner of Patents and Trademarks*